May 24, 1966  M. S. LUBELL ETAL  3,253,193

SUPERCONDUCTING MEANS FOR CONCENTRATING MAGNETIC FLUX

Filed Oct. 21, 1963

WITNESSES
Theodore F. Wrobel
Leon M. Garman

INVENTORS
Martin S. Lubell
& George T. Mallick, Jr.
BY
F. E. Browder
ATTORNEY

United States Patent Office 3,253,193
Patented May 24, 1966

3,253,193
SUPERCONDUCTING MEANS FOR CONCENTRATING MAGNETIC FLUX
Martin S. Lubell and George T. Mallick, Jr., Pittsburgh, Pa., assignors to Westinghouse Electric Corporation, East Pittsburgh, Pa., a corporation of Pennsylvania
Filed Oct. 21, 1963, Ser. No. 317,746
5 Claims. (Cl. 317—158)

This invention relates in general to magnetic apparatus and more particularly to apparatus for compressing or concentrating magnetic flux.

Investigators of the properties of materials at very low temperatures have found that certain materials will become essentially perfect electrical conductors at very low temperatures. The electrical resistance of these so-called superconductors at temperatures below their critical temperature, $T_c$ is immeasurable with ordinary instruments. Another property exhibited by these so-called superconductors is known as the Meissner effect. This phenomenon which is noted at the very low temperatures of superconductivity is the essentially impermeability of such materials to magnetic fields. Magnetic fields do not penetrate into superconductive materials to any measurable extent. As long as the material is maintained in the superconducting condition the material is effectively impervious to magnetic flux and hence acts as an insulator to magnetic flux. An example of such a material is pure lead, a so-called "soft" superconductor which can be made completely diamagnetic. One practical use for this phenomenon in the prior art has been to magnetically shield one electrical device from another. The present invention uses the Meissner effect in a novel way to condense or amplify a magnetic field. Magnetic fields of high strength are desirable for many purposes. Then, too, if a magnetic field is very weak, such as is the earth's magnetic field, such a field can be more readily measured if it is first amplified.

Accordingly, it is the general object of this invention to provide a new and improved method for compressing magnetic flux.

It is a more particular object of this invention to provide a magnetic flux compressor with a minimum of moving parts.

It is yet another object of this invention to provide a magnetic flux compressor which uses the Meissner effect in a new way to concentrate magnetic flux.

It will be understood that when we refer to a superconductor or superconducting material that we mean, more strictly, a material that is capable of being made superconducting. Such a material does not exhibit the phenomenon of superconductivity at all temperatures but only in a relatively small temperature range.

Briefly, the present invention accomplishes the above cited objects by providing a member of superconducting material with an aperture or non-superconducting central portion. The superconducting material is placed with its surface at an angle to a magnetic field. A right angle is preferred so that the member is orthogonal to the flux. Heating means may be used to keep the superconducting material above its critical temperature $T_c$. Magnetic flux will now permeate the whole of the now normal superconductor. The heat supply to the superconducting material is then decreased. This enables a ring shaped portion about the exterior surface of the superconducting material to be cooled to below the critical temperature $T_c$ of the material under the influence of a cooling medium such as liquid helium. The magnetic flux which initially permeated all the volume occupied by the superconducting material is now frozen in or trapped inside of the ring of superconducting material. The source of the applied magnetic field may now be removed or reduced to zero, and the field trapped inside the superconducting material will remain the same as before. This trapping of flux is a result of the superconducting properties of the material; a circulating current is induced in the superconductor which prevents any change in flux linkages. If all heat is now removed from the superconducting material all of the superconducting material will go from the normal to the superconducting state selectively from the outside inward. The thermal gradient or boundary separating the normal and superconducting states will move toward the center of the superconducting material which is either hollow or made of a material incapable of being made superconducting. The trapped magnetic flux will be pushed along in front of this boundary and will in fact be compressed into the non-superconducting center of the material. The flux can go nowhere else because of the Meissner effect or perfect magnetic shielding ability of superconducting materials. All the magnetic flux originally embraced by the outermost dimensions of the superconducting material will be concentrated in the non-superconducting zone at the center of the material. The ratio of cross-sectional area of the superconducting material to the cross-sectional area of the non-superconducting center of the material need only be so chosen that the compressed value of the magnetic field is below the critical magnetic field, $H_c$ for the particular superconducting material used. If one attempted to compress the magnetic field to a value exceeding the critical magnetic field $H_c$, a portion of the superconducting material would be rendered normal allowing the compressed magnetic flux to expand. The compression of the magnetic flux can be stopped short of the non-superconducting zone by a continuous supply of heat to the superconducting material.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
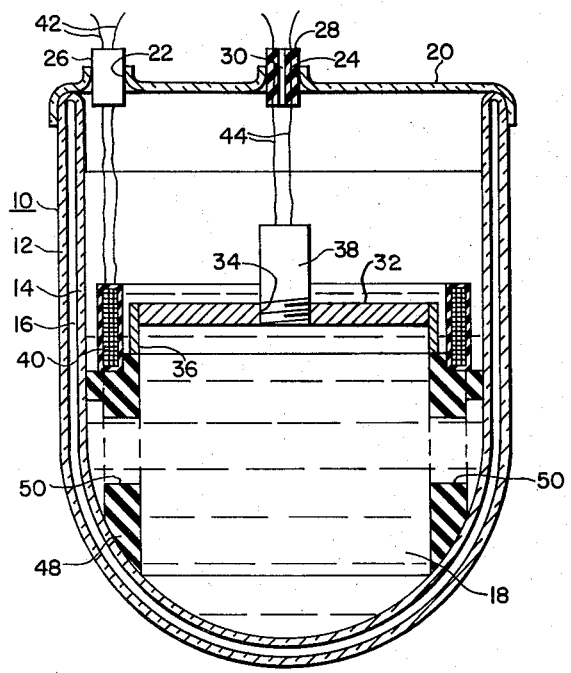
FIGURE 1 is a transverse sectional view of the instant invention in a preferred embodiment.

Referring to the drawings in which like parts have like reference characters, one may see an embodiment of the invention in FIG. 1. A cryostat or Dewar flask generally designated 10 having an outside wall 12, an inside wall 14 and an evacuated space 16 therebetween is provided. The walls of the Dewar flask are preferably made of a material having unit magnetic permeability so as not to distort the magnetic flux pattern; we have found both glass and stainless steel to be satisfactory for this purpose. The cryostat is partially filled with a cooling medium 18 such as liquid helium. The cryostat may be provided with a cover 20 having apertures such as 22 and 24. Plugs 26 and 28 are used to close the apertures after the liquid coolant 18 has been placed in the cryostat 10. Plug 28 may be provided with a small vent 30. An open-centered disk or single turn coil 32 of a bulk form superconducting material is mounted transverse to the vertical axis of the cryostat and is totally immersed in the coolant 18. A sheet or thick walled cylinder of superconducting material could also be used. In a central opening 34 of the superconducting disk 32 a removable electric heater 38 is secured. Alternatively, an insert of a material of good thermal conductivity which is incapable of becoming superconducting may be used in the opening 34; the heater may then be placed against the insert. Although a circular opening is illustrated, any desired aperture may be used to shape the compressed magnetic field. The electric heater 38 is provided with electrical leads 44 which emerge from the cryostat through plug 28. About the superconducting disk 32 is placed a band or hoop 36 of a material having a low thermal resistance such as copper. The hoop is not essential but aids in heat transfer from the disk 32 to the cooling medium 18. External to the disk 32 of superconducting material a source of magnetic flux such as a solenoid 40 is provided. If the solenoid 40 is placed in the cryostat 10, leads 42 from the solenoid 40 may be run to the outside of the cryostat through plug 26 in the cover 20 of the cryostat. Mechanical support for the disk of superconducting material 32 and its associated apparatus is provided by a support structure 48. The support structure may be of any material which has mechanical strength at very low temperatures such as brass or an epoxy resin. The support structure may be provided with apertures 50 to allow free circulation of the cooling medium 18. It is not desirable to construct the support structure 48 of a magnetic material which would distort the magnetic flux pattern through the disk 32. Alternatively, the disk 32 may be supported from above by a suspension of low thermal conductivity.

Figure 2:
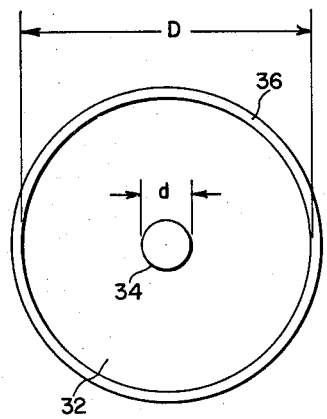
FIG. 2 is a bottom plan view of a portion of the apparatus shown in FIG. 1.

Referring to FIG. 2 there is illustrated a bottom plan view of the open centered disk or single turn coil of superconducting material 32. The hoop or band 36 of high thermal conductivity material is also illustrated. It will be observed that the diameter $d$ of the central aperture 34 is considerably smaller than the diameter $D$ of the disk of superconducting material 32. If all the flux initially cutting the superconducting disk 32 is compressed into the aperture 34 the flux density in the aperture $H_a$ is equal to the original flux density $H_o$ times the ratio of the square of the diameter $D$ of the disk 32 to the square of the diameter $d$ of the aperture 34.

$$H_a = H_o \times \frac{D^2}{d^2} \leq H_c$$

If the diameter $d$ of the aperture 34 is 1/8 of an inch and the diameter of the disk 32 is three inches a multiplication of flux density of 576 times is possible. The compressed value of the magnetic field $H_a$ should not be so great however as to exceed the critical magnetic field $H_c$ of the superconducting material being used; if the central aperture 34 of the disk 32 is made too small, the compressed magnetic flux $H_a$ will exceed the critical magnetic field $H_c$ and will render normal a zone about the central aperture 34 permitting flux to pass through a portion of the disk and thereby preventing optimum flux compression. It is well known that a flux density greater than $H_c$ destroys superconductivity and thus the Meissner effect.

Figure 3A:
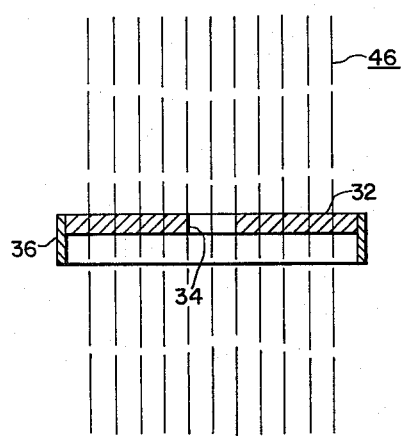
FIG. 3A is a transverse sectional view of the portion of the apparatus shown in FIG. 2 before flux compression.
Figure 3B:
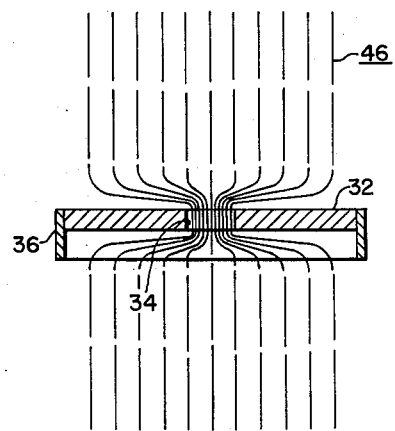
FIG. 3B is a transverse sectional view of the portion of the invention shown in FIG. 3A after flux compression.

Particular reference is now made to FIGS. 3A and 3B which show before and after views of a magentic field passing normally or orthogonally through a hollow member such as a disk or single turn coil 32 of superconducting material in a direction parallel to the axis of the disk. In FIG. 3A it will be observed that a magnetic field comprising a plurality of magnetic flux lines 46 passes through the superconducting material 32 and the central aperture 34 in an evenly distributed pattern transverse to the plane of the disk 32. These flux lines may come from any convenient source such as the solenoid 40 of FIG. 1, the earth's magnetic field, or from permanent magnet means. In FIG. 3B one may see how a thermal gradient or boundry between superconducting and normal zones moving in radially from the outside of the superconducting material constricts or pinches a portion of the magnetic field into the central aperture 34 as the lines of magnetic flux pass through the disk or single turn coil of superconducting material 32. It will be noted that the magnetic flux lines 46 revert to their original density upon leaving the influence of the superconducting material 32. The axial thickness of the disk for some applications may be reduced so that the disk is a film or sheet. The superconducting material should not be made thinner than the penetration depth of the magnetic flux which is on the order of a thousand angstrom units.

In operation, a magnetic field from any convenient source such as the solenoid 40 on FIG. 1 is passed parallel to the axis of the disk of superconducting material 32. Heat is supplied to the superconducting material to maintain the superconducting material at a temperature above $T_c$ the critical temperature of the material. The critical temperature of the material is the temperature at which the material will become superconducting and hence impervious to lines of magnetic flux. Sufficient cooling fluid such as liquid helium 18 is in the cryostat 10 to contact the hoop 36. The heat being supplied to the superconducting material by the electric heater 38 is now decreased slightly. The outmost rim or periphery of the disk 32 near the hoop 36, being furthest from the source of heat, will now become superconducting. The magnetic flux which initially permeated all the volume occupied by the superconducting material and the central aperture is now "frozen in" or trapped inside of the rim of superconducting material which will not pass magnetic flux due to the Meissner effect. The external source of magnetic field may now be removed or reduced to zero by turning off the current in solenoid 40 and the magnetic field that is trapped inside the superconducting zone near the hoop 36 will remain constant due to an induced current in the open-centered disk or single turn coil 32. The heater 38 may be turned off and even removed; now the entire disk will become superconducting, cooling rapidly from the hoop 36 radially inward. Because of the cylindrical symmetry of the superconducting material 32, the thermal boundary between the superconducting outer zone of the disk 32 and the normal inner zone of the disk 32 will move progressively inward from the edges of the disk towards the aperture 34 pushing the trapped magnetic flux 46 in front of it. The magnetic flux has nowhere else to go since superconducting material can contain no magnetic flux. All the magnetic flux originally embraced by the outermost diameter $D$ of the disk 32 will now be concentrated in the central aperture 34. More coolant 18 can now be added to the Dewar flask 10 to completely cover the superconducting material 32. The heater 38 can be dispensed with if the disk 32 is lowered into the flask 10 from above; the disk 32 will not become superconducting until the hoop contacts the coolant. If the disk is held just above the level of the coolant the disk will be cooled progressively inward from the hoop because only the hoop is in contact with the coolant.

It is not necessary that the device possess cylindrical symmetry, other geometries could be employed to concentrate magnetic fields in holes of other shapes. The amount of heat initially supplied to the device need not be great; all that is required is that initially the superconducting material must be held normal at just above its critical temperature.

It will, therefore, be apparent that there has been disclosed a compressor for magnetic flux which can be used to compress magnetic flux for purposes of measurement or for use in applications which require a magnetic flux density greater than can be obtained by other methods.

Since numerous changes may be made in the above-described apparatus and different embodiments may be made without departing from the spirit thereof, it is intended that all the matter contained in the following description or shown in the accompanying drawing shall be interpreted as illustrative and not in a limiting sense.

We claim as our invention:

1. A compressor for magnetic flux comprising a member constructed of a material capable of being made superconducting at a given temperature, a band of material of high thermal conductivity disposed about the periphery of said member, cooling means disposed about said member, said cooling means capable of lowering the member to at least the given temperature, a zone incapable of being made superconducting located in said member, and heating means in contact with said zone to control the cooling of the member so that the temperature of the periphery of the member is first cooled at least as low as the given temperature and then the rest of the member is so cooled progressively inward from the periphery of the member to said zone.

2. A magnetic flux compressor comprising first means capable of being made superconducting below a predetermined critical temperature, said first means having an aperture therein, second means providing a magnetic field, said first means being disposed in said magnetic field, third means cooling said first means below its critical temperature, and fourth means controlling the cooling of said first means, to trap the magnetic field originally in said first means and squeeze it into the aperture when said first means becomes completely superconducting.

3. A magnetic flux compressor comprising first means capable of being made superconducting below a predetermined critical temperature, said first means having a zone therein incapable of being made superconducting, second means providing a magnetic field, said first means being disposed in said magnetic field, third means cooling said first means below its critical temperature, and fourth means controlling the cooling of said first means, to trap the magnetic field originally in said first means and force it into said zone.

4. A magnetic flux compressor comprising first means having a body portion with an aperture therein, means providing a magnetic field, said first means being disposed in said magnetic field with its aperture being substantially parallel with said magnetic field, said first means being made of a material capable of being rendered superconducting, heating means disposed in the aperture of said first means, cooling means surrounding said first means, and means rendering said first means superconducting from the outside inward by controlling the temperature of said heating means, forcing the magnetic field in the body portion of said first means into the aperture.

5. A concentrator for a magnetic field comprising means providing a magnetic field, a disc of material capable of being made superconducting, said disc being disposed in said magnetic field substantially perpendicular to the direction of the magnetic field, said disc having a centrally disposed aperture therein whose axis is substantially parallel with the magnetic field, means cooling said disc, and means controlling the cooling of said disc, to reduce the disc below its critical temperature progressively inwardly in a radial direction from the periphery of the disc to the aperture, trapping the magnetic flux originally passing through the disc and forcing it into the central aperture thereof.

References Cited by the Examiner

UNITED STATES PATENTS

| | | | |
|---|---|---|---|
| 2,914,735 | 11/1959 | Young | 332—51 |
| 3,150,291 | 9/1964 | Laquer. | |
| 3,156,850 | 11/1964 | Walters. | |
| 3,161,809 | 12/1964 | Swartz. | |

OTHER REFERENCES

Hildebrandt et al.: Journal of Applied Physics, vol. 33, No. 7, July, 1962. Pp. 2375–2377.

BERNARD A. GILHEANY, *Primary Examiner.*

LARAMIE E. ASKIN, *Examiner.*

G. HARRIS, JR., *Assistant Examiner.*